United States Patent
Eshet et al.

(10) Patent No.: US 7,634,459 B1
(45) Date of Patent: Dec. 15, 2009

(54) APPARATUS, METHOD AND COMPUTER-CODE FOR DETECTING CHANGES IN DATABASE-STATEMENT EXECUTION PATHS

(75) Inventors: Ehud Eshet, Modiin (IL); Sigal Gelbart, Hod Hasharon (IL); Dan Zada, Mevaseret Zion (IL); Liad Hacmon, Or Yehuda (IL)

(73) Assignee: Precise Software Solutions Ltd., Or Yehuda (IL)

( * ) Notice: Subject to any disclaimer, the term of this patent is extended or adjusted under 35 U.S.C. 154(b) by 184 days.

(21) Appl. No.: 11/560,391

(22) Filed: Nov. 16, 2006

(51) Int. Cl.
*G06F 17/30* (2006.01)
(52) U.S. Cl. .............................. 707/2; 707/1
(58) Field of Classification Search ................ 707/1–3; 700/32, 33; 719/318
See application file for complete search history.

(56) References Cited

U.S. PATENT DOCUMENTS

| | | | |
|---|---|---|---|
| 5,471,629 A * | 11/1995 | Risch | 707/201 |
| 6,351,742 B1 * | 2/2002 | Agarwal et al. | 707/3 |
| 2004/0205048 A1 * | 10/2004 | Pizzo et al. | 707/3 |
| 2005/0038833 A1 * | 2/2005 | Colrain et al. | 707/203 |
| 2005/0192921 A1 * | 9/2005 | Chaudhuri et al. | 707/1 |

OTHER PUBLICATIONS

FAQ VERITAS™ VERITAS Indepth™ for Oracle pp. 1-4, 2003.
Symatec Indepth™ for Oracle Standard Edition User's Guide pp. 1-330, 2005.

* cited by examiner

*Primary Examiner*—Uyen T. Le
(74) *Attorney, Agent, or Firm*—Mark M. Friedman (57) ABSTRACT

Apparatus, methods, and computer code for monitoring a database and for detecting execution plan changes in the database. In the event that an execution plan is detected for a given database statement during the course of the monitoring, an alert signal may be generated. Optionally, the generation of the alert signal is further contingent upon a property of the database statement for which an execution plan change has been detected, for example, an execution time. In some embodiments, a detection agent is configured to repetitively attempt to detect an execution plan, for example, in accordance with a specified frequency parameter.

21 Claims, 8 Drawing Sheets

APPARATUS, METHOD AND COMPUTER-CODE FOR DETECTING CHANGES IN DATABASE-STATEMENT EXECUTION PATHS

BACKGROUND OF THE INVENTION

1. Field of the Invention

The present invention relates to methods, apparatus and computer-code for database administration.

2. Related Art

Relational databases provide an SQL interface for accessing (i.e. reading and/or writing) data stored in a data repository. Because SQL is a declarative language, there is sometimes more than one way to execute any given SQL query, each way producing identical results.

In the present disclosure, an 'execution plan' or a 'query plan' or a 'query execution plan' is a set of steps used to access information in a SQL relational database. Typically, each execution plan is associated with a different 'cost' indicative of a service time and/or amount of resources required to effect the SQL database query using the given plan. Thus, most SQL relational database include a query optimization engine or 'query optimizer' that, when handling an SQL query, may evaluate the cost of one or more execution plans and select the optimal execution plan.

Most modern relational databases (i.e. Oracle®, MS-SQL®, Sybase®, MySQL®, etc) provide a feature for displaying, upon request, a description (i.e. via a text interface and/or GUI) of an execution plan. In one example, an 'EXPLAIN PLAN" statement may be submitted to the database. Information describing execution plans may be very useful for analyzing why a specific query is running slowly, and thus may be useful for 'tuning' or re-structuring a database (i.e re-writing queries, modifying a database schema, upgrading physical equipment used by the database, etc.) in order to improve performance. This execution plan related information may include, for example, a description of how tables are joined and in which order and/or a list of which indices that are used when seeking data and/or a list of which sort operations are carried out when executing the query, and/or other related information.

It would be highly desirable to have a tool which facilitates further exploitation of information relating to database execution plans.

SUMMARY

By monitoring the query execution plans of a database (i.e. during runtime of that database) and, upon detecting a change in an execution plan for any given SQL statement, generating an 'alert signal' indicative of the execution plan change, performance affecting events can be quickly identified. As a result, users (e.g. database administrators) can receive timely notice of events that can potentially influence database performance.

Not wishing to be bound by any particular theory, it is noted that when handling a database statement, the query optimization engine of the monitored database is operative to attempt to select a particular execution plan for the statement that provides an optimal database performance. This execution plan is selected, by the query optimization engine, in accordance with one or more 'input' parameters (i.e. execution plan influencing factors), at least some of which are potentially related to database performance.

As such, when the query optimization engine selects an execution plan that is different from an execution plan previously used/designated by the database for the same database query, this may be in and of itself a 'significant' event that should be reported to a user (for example, a database administrator (DBA) interested in administrating and/or tuning the database). More specifically, this execution plan 'change' may reflect the occurrence of a 'significant' database performance influencing event that has occurred since the time that the previous execution plan was selected by the query optimization engine.

As noted above, occurrence of certain events may influence selection of an execution plan and may potentially have an impact on database performance. These execution plan influencing events include but are not limited to: index events (for example, adding an index, dropping an index, modifying an index), table statistics events (for example, an updating of statistics for one or more tables associated with a query), a physical infrastructure events (for example, a filling up of a disk or a 'network slowdown event' or a 'network speedup event'), and table size events (for example, an increase or decrease in a size of a table associated with the database query).

Theoretically, it is also possible to monitor one or more parameters associated with these aforementioned events (for example, to monitor table index parameters, table size parameters, disk occupancy parameters, etc) and to generate an alert signal when the value of a monitored parameter deviates (for example, to generate an alert signal when an index is added, or in another example, when the amount of free space of the disk decreases below a certain threshold, or in another example, when the network speed changes by some predetermined threshold) from a previous value. Concomitant monitoring one of these parameters and generating an alert signal contingent on the concomitant monitoring is certainly not precluded by the present invention.

Nevertheless, and not wishing to be bound by any particular theory, it is noted that there may be certain situations where it is not clear which monitored parameters and/or execution plan influencing events and/or database performance influencing events are 'significant' (i.e. have a 'significant' potential to influence database performance). In the event that 'too many' alerts are generated, there may be a risk that the user will either become overburdened by the alerting system or will not respond seriously to a potentially significant alert. In the event that 'too few' alerts are generated, there is a risk that the user will remain uninformed about an event that can have a potentially adverse affect on database performance The present inventor has thus concluded that it is useful to generate alert signals contingent on a change in execution plan. Indeed, in certain situations this may serve as an effective 'filter' so that only potentially 'significant' events and/or changes in the database environment are reported with an alert signal. This may obviate the need for establishing criteria (for example, the need for determining pre-determined 'threshold' values) related to which parameter and/or environment changes warrant generating an alert signal.

In another example, it is noted that it is also possible to generate alert signals when, for example, the service time of an give query or set of queries increases by a certain percentage, or when the amount of resources consumed by a given query or set of queries increases by a certain percentage. Once again, this is not precluded by the present invention. Nevertheless, the present inventor is noting that generating alert signals contingent on a temporal modification of a query execution plan may provide a convenient 'filter' for determining when to generate an alert signal, and may obviate the need to determine baseline and/or threshold values for query performance.

It is now disclosed for the time apparatus for monitoring execution plans of a database. The presently disclosed apparatus comprises: a) a detector agent operative to monitor the database (i.e. on an ongoing basis) to detect an execution plan change for at least one database statement handled by the database; and b) an alert agent operative to generate an alert signal, contingent on results of the detecting of the execution plan change (i.e. the results carried out during the ongoing monitoring).

As used herein, an 'agent' (for example, a detector agent or collector agent or alert agent) refers to computer code operative to carry out one or more tasks.

As used herein, a 'detector agent' is operative to monitor a database on an ongoing basis i.e. by attempting, to detect a presence or absence of an execution plan change, at various different times (i.e. repeatedly attempting to detect an execution plan change).

As used herein, an 'alert agent' is an agent operative to generate an alert signal in response to the ongoing database monitoring carried out by the detector agent. Thus, the 'alert signal' is 'contingently' generated in response to the ongoing monitoring of the database by the 'detector agent.' Only if the detector agent, during the course of ongoing the database monitoring, detects a change of an execution plan is the alert signal generated—i.e. the alert signal is contingently generated.

In some embodiments, the presently disclosed apparatus further comprises: c) a performance data collector agent operative to collect performance data comprising execution plan data for the database, wherein the detector agent is operative to detect the execution plan change from the collected execution plan data.

As used herein, a 'collector agent' is operative to collect performance data an on ongoing basis—i.e. by collecting a sample of performance data, to detect a presence or absence of an execution plan change, at different times (i.e. repeatedly collecting different samples of performance data).

As used herein, 'execution plan data' is data identifying any given execution plan. This may be, for example, self descriptive of the execution plan, or it may be an identifier that identifies the execution plan without necessarily describing the execution plan—for example a plan hash value.

As used herein, 'historical performance data' is data that describes a manner in which one or more activities (for example, execution of database statements such as queries and/or stored procedures) have been carried out by the configurable, executing, database during a historical time period for the database.

According to some embodiments, the performance data collector agent is operative such that the collecting of the performance data comprises effecting a query of a system table of the database.

According to some embodiments, the performance data collector agent is operative such that the collecting of the performance data comprises effecting an API call to the database.

According to some embodiments, the performance data collector agent is operative to collect the performance data comprising the execution plan data for a pre-specified historical time interval.

According to some embodiments, the collector agent is operative to effect a plurality of the execution plan data collections at a frequency that is determined at least in part by a pre-determined frequency parameter.

According to some embodiments, the detector agent is operative to effect a plurality of the execution plan detectings at a frequency that is determined at least in part by a pre-determined frequency parameter.

According to some embodiments, the apparatus further comprises, c) a configuration user-interface for receiving at least one user specified operation parameter selected from the group consisting of: i) a detection frequency parameter; and ii) decision influencing historical time period parameter, and the detector is operative to effect the monitoring in accordance with at least one user specified operation parameter.

According to some embodiments, the detector agent operative to detect the execution plan change for a pre-determined decision influencing historical time period.

According to some embodiments, at least one of: i) the alert agent; and ii) the detector agent, is at least partially an internal agent that resides at least in part within a code module of the database.

According to some embodiments, at least one of: i) the alert agent; and ii) the detector agent, is at least partially an external agent that resides at least in part within a code module that is external to the database.

According to some embodiments, the alert agent is operative within the apparatus such that the generating of the alert signal is contingent on the detected execution plan change in an execution plan change type-independent manner.

According to some embodiments, the detector agent is further operative to detect at least database statement execution time parameter selected from the group consisting of: i) database statement execution time; ii) a change in a database statement execution time for a repeatedly executed database statement; and the alert agent is further operative to generate the alert signal contingent on results of the detected database statement execution time parameter.

This database statement execution time parameter may be a 'sign parameter' (i.e. indicative of an improvement of performance or a performance degrading—thus, only if the performance degrades is an alert signal generated) and/or may be a 'magnitude parameter.'

It is now disclosed for the first time a method for monitoring execution plans of a database, the method comprising: a) monitoring a database with a detector agent to detect an execution plan change for at least one database statement handled by the database; and b) generating an alert signal, contingent on results of the detecting of the execution plan change.

According to some embodiments, the monitoring comprises effecting a plurality of the execution plan detectings at a frequency that is determined at least in part by a pre-determined frequency parameter.

According to some embodiments, the method further comprises: c) receiving, via a user interface at least one user specified operation parameter selected from the group consisting of: i) a detection frequency parameter ii) decision influencing historical time period parameter, wherein the monitoring is carried out in accordance with at least one user specified operation parameter.

According to some embodiments, the monitoring further comprises detecting at least database statement execution time parameter selected from the group consisting of: i) database statement execution time; ii) a change in a database statement execution time for a repeatedly executed database statement; and the generating of the alert signal is contingent on results of the detected database statement execution time parameter.

According to some embodiments, the monitoring comprises attempting to detect a plurality of execution plans for a single query in a set of historical performance data.

According to some embodiments, the method further comprises: c) for each of a plurality of times, collecting a respective set of historical performance data, wherein the monitoring comprises effecting to detect the plurality of execution plans in each the respective set, and wherein a frequency of the respective collecting is determined at least in part by a pre-determined frequency parameter.

These and further embodiments will be apparent from the detailed description and examples that follow.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to'), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed system, method and computer-readable code for instrumenting instructions for detecting database execution plan changes and/or generating an alert signal contingent on the aforementioned detecting is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein.

In one embodiment, a database monitoring tool (i.e., an apparatus, a computer-implemented method and/or computer code for monitoring a database) generates an alert signal if a change in an execution plan (i.e. a temporal change) is detected. The detecting of 'an execution plan change' may be carried out be detecting, for at least one database statement or query, an indication of a first execution plan associated with a first point in time (for example, used by the monitored database system when executing the database statement at a first point in time), and an indication of a second execution plan different from the first execution plan associated with a later point in time (for example, used by the monitored database system when executing the same database statement at a later point in time).

In one embodiment, the alert agent thus 'pushes' the alert to the user without requiring a user to 'proactively' request execution plan data at a given point in time. This execution plan alert can, for example, be useful for indicating to a user (for example, a DBA) that an event of potential significance to database performance has occurred.

The presently disclosed apparatus and method may be implemented using any combination of software and hardware. In one embodiment, the presently disclosed apparatus is implemented using a single computer device or a plurality of computer devices in communication with each other.

Figure 1:
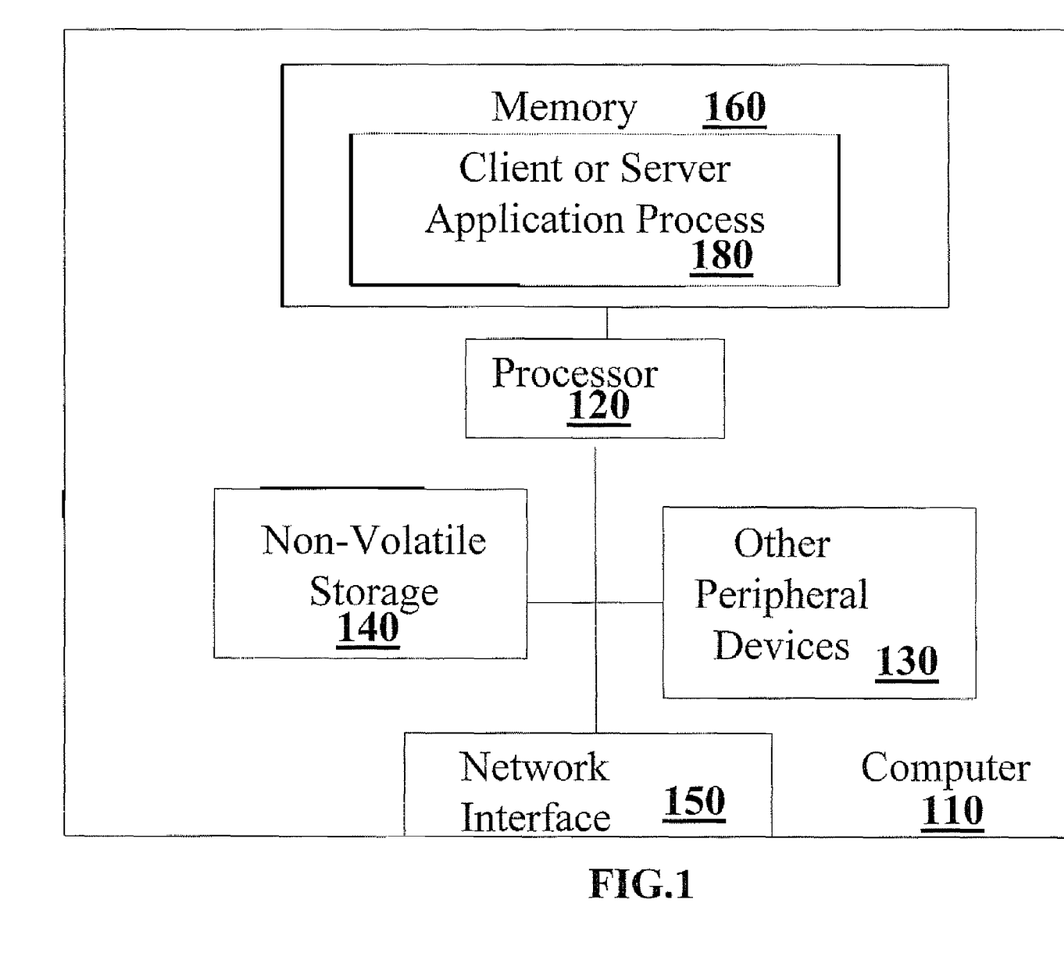
FIG. 1 provides a block diagram of a computer in accordance with exemplary embodiments of the present invention.

FIG. 1 illustrates one embodiment of a computer 110 including a processor 120. Processor 120 is shown coupled to a memory 160, a non-volatile storage 140, a video display device 135, a mouse 145, a keyboard 155, and a network interface 150 such as a network interface card. It is appreciated that not every element is required in every embodiment.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM®, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 3, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

Figure 2A:
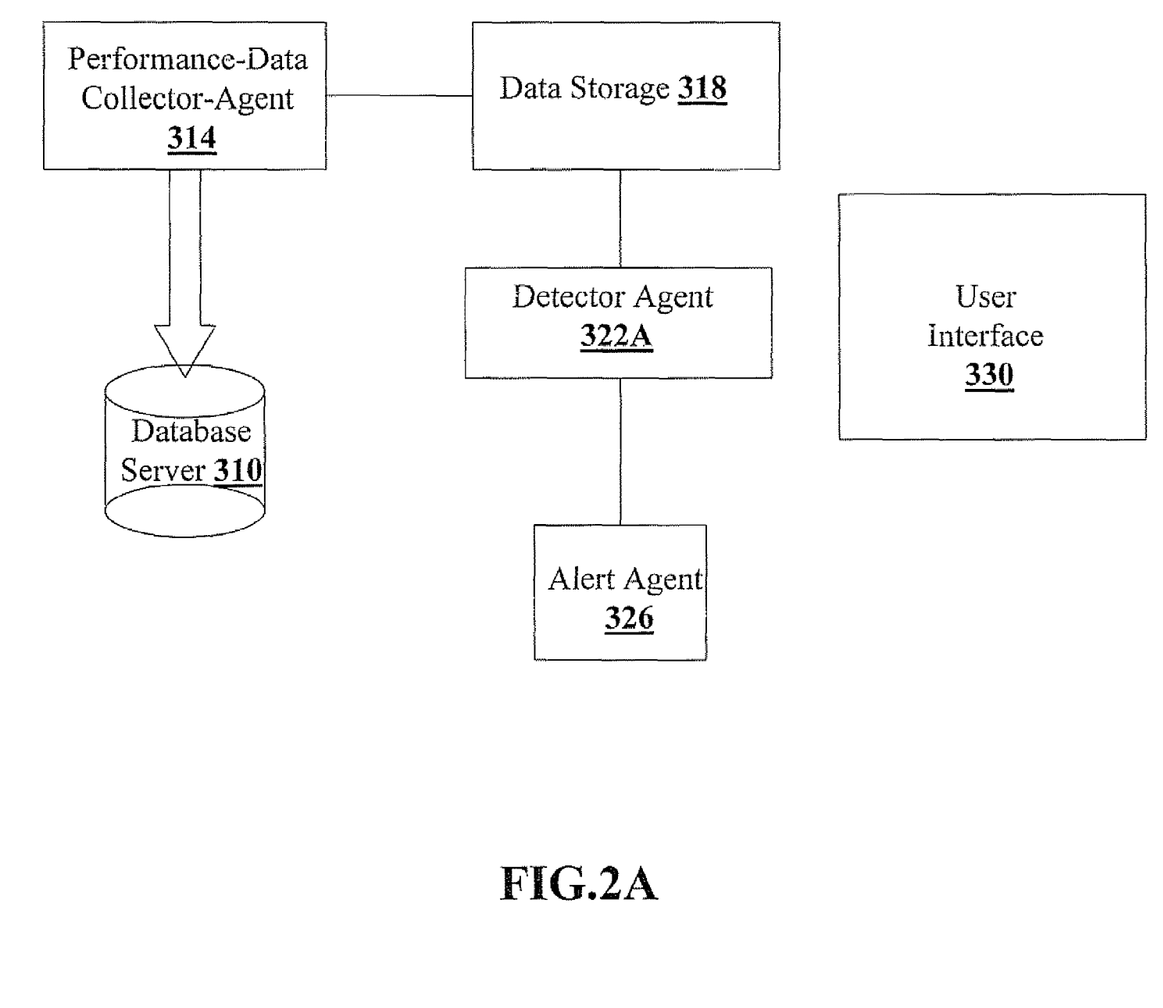
FIGS. 2A-2B each provide a block diagram of respective system for generating alert signals in accordance with a detected temporal change of a database execution plan according to some embodiments of the present invention.

Discussion of FIG. 2A

FIG. 2A provides a block diagram of an exemplary architecture for (a) collecting performance data for an executing configurable database 310 including execution plan data by a performance data collector 314; (b) storing the collected performance data in a data storage 318; (c) detecting, using a detector agent 322A, from the stored execution plan data, a temporal change of an execution plan during a certain time period; and (d) contingent on the results of the execution plan detecting, generating an alert signal with an alert agent 326.

It is appreciated the data storage 318 may store data other than the historical performance data 322. The data of the data storage 318 may be accessible by any number of executing processes on a single computer 110 or from multiple computers. Furthermore, data storage 318 may be implemented in any combination of volatile memory 160 (including but not limited to RAM) and non-volatile storage 140 (including but not limited to magnetic storage and flash storage).

Exemplary routines for data collection, data analysis, and issuing the alert are discussed below with reference to FIGS. 3A-3B and 4A-4B.

As with any embodiment of the present invention, the system of FIG. 2A as a whole as well as each individual component may all reside on a single computer 110 or may be 'distributed' among more than one computer 110 in communication via a local or wide-area computer network.

Database server 310 or database management system is typically a relational database, including but not limited to Oracle®, MS-SQL®, Sybase®, IBM DR2®, and MySQL®.

As used herein, an 'agent' (for example, detector agent 322 or alert agent 326) refers to computer code operative to carry out one or more tasks. The computer code may be implemented in any single computer language or combination of computer languages, including but not limited to machine-readable code (for example, machine language or assembler), so-called intermediate code (for example, Java byte code or .NET), compiled code (for example, compiled C++ code), and human readable code (for example, query language code such as SQL; for example, scripting code). The agent may be deployed in any number of process spaces, and on any number of computers 110 (for example, residing on a single computer 110, or the agent may be 'distributed' among a plurality of machines).

In the example of FIG. 2A, the system provides a user interface 330 (for example, a graphic user interface (GUI)) for specifying one or more operating or 'configuration' parameters for detecting changes of execution plans and/or generating an alert signal contingent upon the existence of a detected change of an execution plan for a given database statement. Specific operating or 'configuration' parameters are discussed below with reference to FIGS. 3A-3B and 4A-4B.

Alternatively or additionally, one or more of the operating parameters are determined using default values and/or values specified in a configuration file.

It is noted that the architecture of FIG. 2A is just one possible configuration, and other configurations for alerting in the event of a detected change in execution plan are also within the scope of the present invention.

In the example of FIG. 2A, various components (for example, one or more of the 'agents'—i.e.) are 'separate' from the monitored database management system 310—reside in code modules outside of the code of the monitored database management system or database server 310.

Figure 2B:
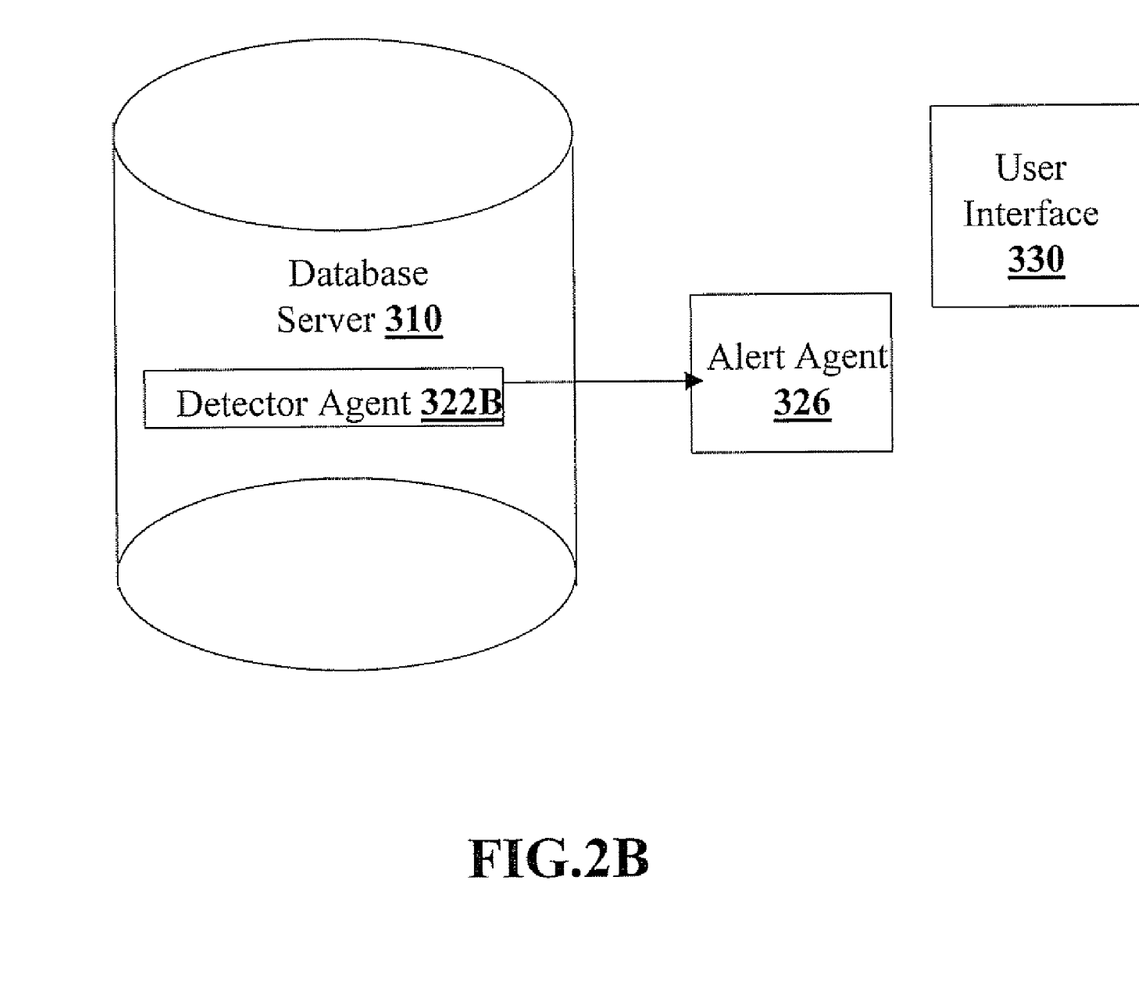

Discussion of FIG. 2B

An alternative architecture is described in FIG. 2B. In the example of FIG. 2B, the detecting agent 322B is an 'internal detection agent' residing within the database management system (i.e. within a code module of the database management system), as opposed to the 'external detection agent' which is separate from the modified database.

In various examples, after each query, or after a pre-determined number of queries, or when a certain event occurs, or after a pre-determined amount of time has elapsed, the 'internal' detecting agent 322B of FIG. 2B notifies the alert agent 326 (which may be an 'internal' or 'external' agent) of the existence of an execution plan change. In accordance with this notification by the detecting agent 322 (for example, setting an 'alert flag' in memory), the alert agent generates the alert signal.

Figure 3A:
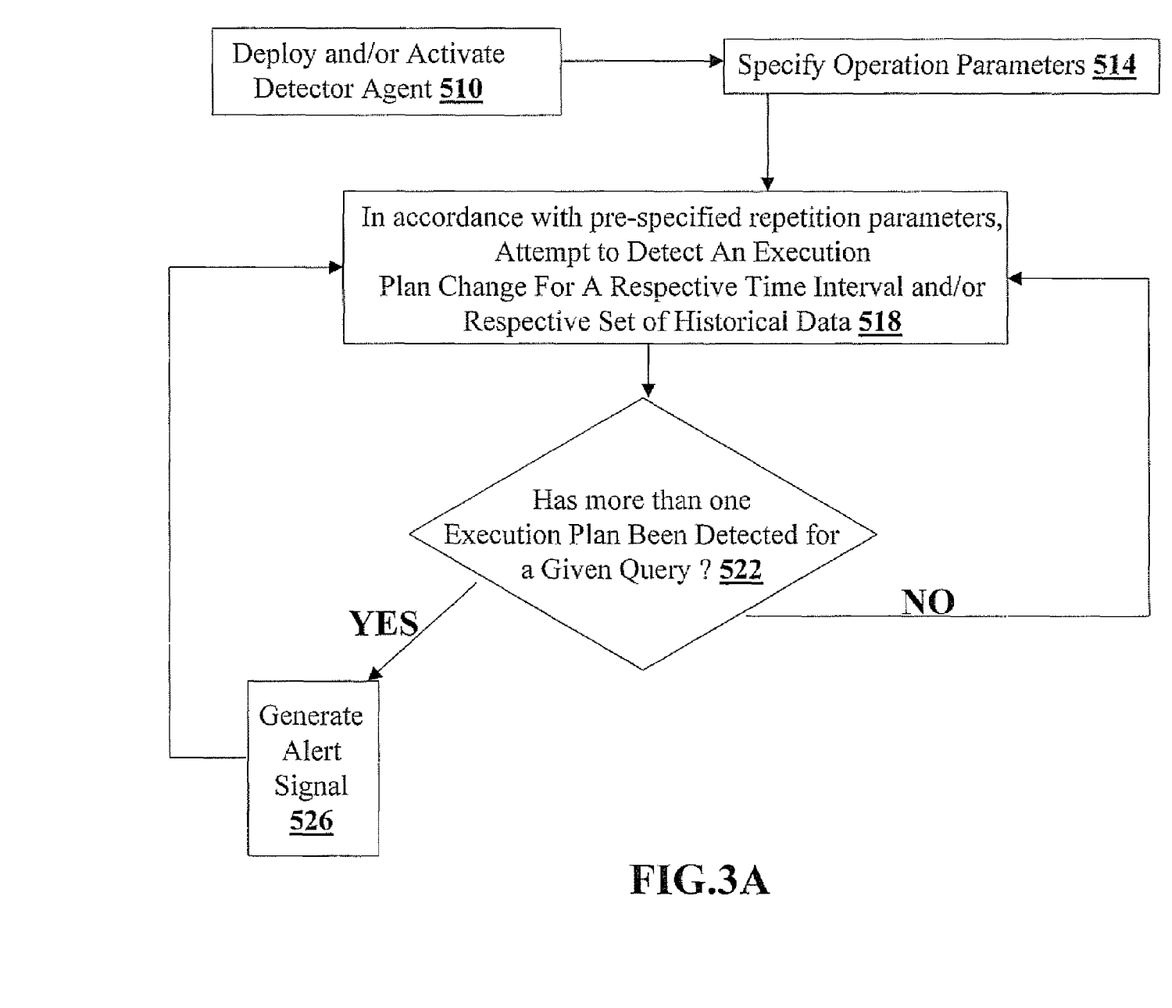
FIGS. 3A, 4A-4C each provide a respective flow chart diagram of an exemplary respective routine for detecting one or more temporal changes of a database execution plan and automatically, contingently generating an alert signal according to some embodiments of the present invention.

Discussion of FIG. 3A (part 1)

FIG. 3A provides a flow chart describing an exemplary routine for detecting changes in query execution plans and generating an alert if, for a given database statement, a query execution plan change is detected. Each step of FIG. 3A is described below. It is appreciated that not every step in the routine of FIG. 3A, or in any presently disclosed routine, is a requirement for the present invention.

In step 510, detector agent 322 is deployed and/or activated 510. In step 514, one or more operating parameters of the detector agent 322 are specified 514—for example, a detection frequency parameter. One non-limiting example of an 'operation parameter' is a frequency parameter for specifying how often steps 518 and/or 522 are repeated. Another non-limiting example of an 'operation parameter' is a 'historical time period' parameter, which is discussed below with reference to FIG. 3B.

As noted earlier, the operation parameters may be default parameters of the system and/or user specified parameters—for example, specified with user interface 330 and/or specified in a configuration file.

Once again referring to FIG. 3A, it is noted that the detecting of the changed execution plan 518 and the contingent generation 516 of the alert signal are automatically carried out a plurality of times, each time with a different set of historical data for the monitored database 310 (for example, each time for a different historical time interval or set of historical time intervals). In some embodiments, the 'frequency parameter' specified in step 514 determines, at least in part, at least one of: (i) how often the detecting of the changed execution plan is carried out (or a 'frequency' at which the detectings (e.g. 518 or 556) occur, each detecting being associated with a different sample set of historical data) and/or (ii) how often a new 'batch' of historical data is collected or sampled using the collector agent (or a 'frequency' of data collecting events 552).

In one example, the detection 'frequency parameter' is a 'time frequency parameter' specifying, at least in part, an amount of time that should elapsed between different attempts to detect the execution plan change.

In another example, the detection 'frequency parameter' is a 'database statement execution' frequency parameter, specifying, at least in part, a frequency in terms of how many database statements are handled (for example, executed) by the database management system 310 between different attempts to detect.

In one non-limiting example, the detection agent is operative to attempt to detect a changed execution plan, for example, approximately every 15 minutes. It is recognized that if the detecting is attempted 'more often than necessary' this may consume extra computational resource, while if the detecting is attempted 'not often enough' this may produce a situation where an alert of a changed execution plan is undesirably delayed.

It is appreciated that one or more operating parameters of the agent 322 may be specified 514 one more than one occasion (for example, the user may 'update' a frequency parameter via user interface 330), or may be specified before the deployment and/or activation 510 of the detector agent. In step 518, an attempt is made to detect an execution plan change for a historical time interval and/or historical set of data for the database management system 310.

Figure 3B:
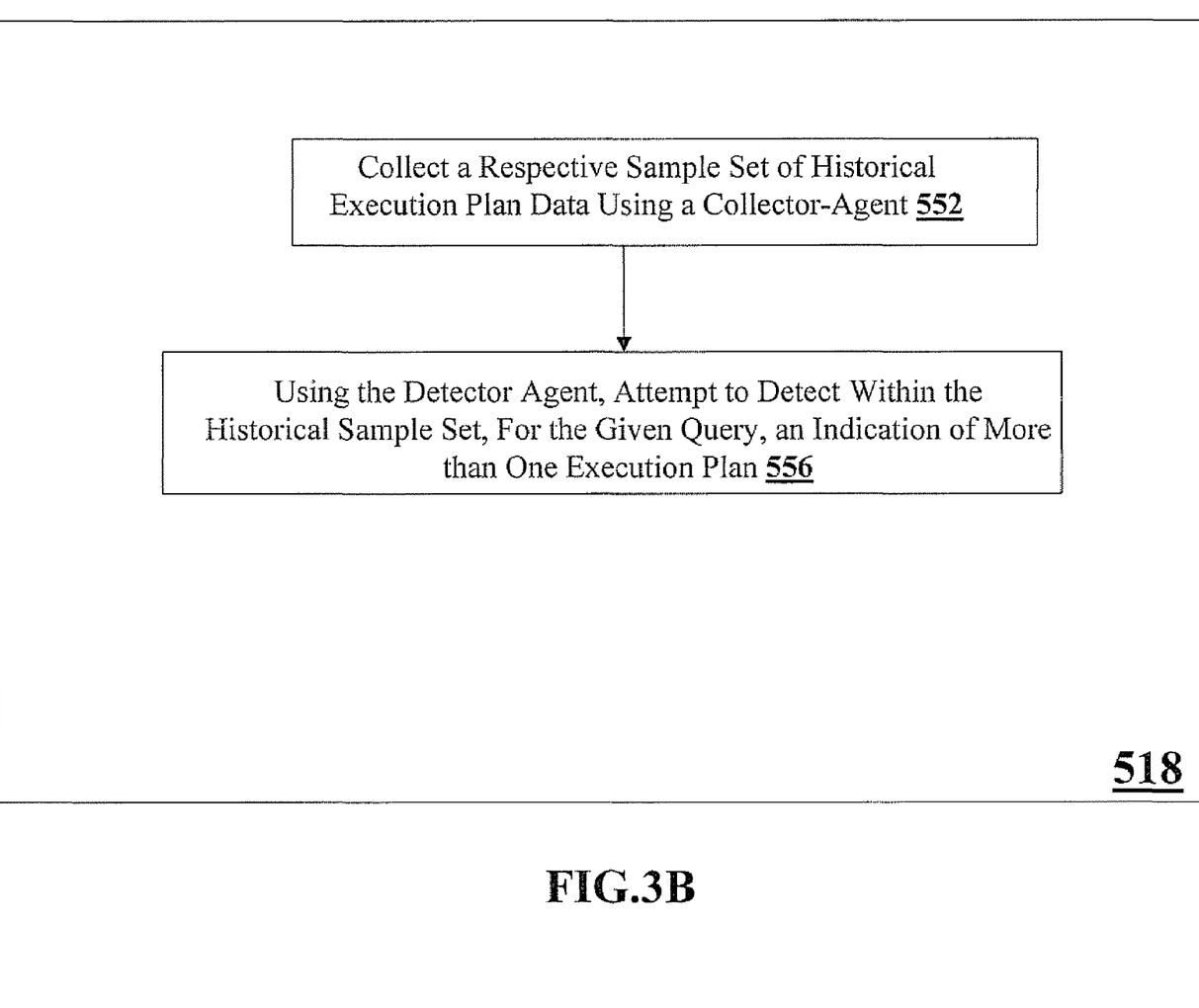
FIG. 3B provide a flow chart diagram of an exemplary routine for detecting an execution plan change.

Discussion of FIG. 3B

The detecting of the execution plan change may be carried out in a number of ways. FIG. 3B describes an exemplary routine for detecting 518 a change in an execution plan. According to FIG. 3B, a sample set of historical execution plan data (referred to as a 'respective sample set' because step 518 is carried out a plurality of times, each time associated with an respective historical time interval and/or respective set of historical data) is collected 552 from database server 310, for example using collector agent 314.

There is no limitation on how the collection 552 may be carried out. In one example, one or more 'EXPLAIN PLAN" queries may be submitted to database server 310. Although this may not be the most scalable solution in certain real-world situations, it is noted that this technique is still within the scope of the present invention.

Alternatively or additionally, one or more requests for data stored in a so-called 'system table' of the database are submitted to the database management system 310. In one specific example related to the Oracle® database, plan hash values for one or more queries are extracted from the "v$sql_plan" or the "v$sql" table.

In some embodiments, data describing the execution plan (i.e. 'descriptive data') is collected or harvested from the database server 310. Nevertheless, it is noted that it is not required to access or to collect an actual description of each execution plan, and in some embodiments, for some or all queries, only an execution plan identifier (for example, a so-called "Plan Hash Value" stored in the "v$sql_plan" table of the Oracle® database) is collected from the database.

In another example, a call is effected to a database API to receive identifiers of various execution plans.

In step 556, the collected historical execution plan data is analyzed to attempt to detect an execution plan change. This may be carried out by attempting to detect an indication of a plurality of execution plans that are associated with a given query during a historical time period. If the same query is associated with (e.g. was executed using) two different execution plans during a historical time period (i.e. if there exist two different execution plans for the same query in the historical time period), this is indicative of an execution plan change during the historical time period.

Detection-Influencing Historical Time Periods

In some embodiments, each detecting is associated with a different 'batch' of historical data associated with a historical time period whose properties (for example, the length of the time period) may be specified, for example, by a decision influencing historical time period parameter.

Thus, in one example, if a 'detection influencing' historical time period of a length '8 hours' is specified (for example, a directive is given to only detect using data from the most recent 8 hours of operation of the database system 310), an attempt will be made to determine if there is any database statement for which more than one execution plans was used in the last 8 hours. In some embodiments, this may entail attempting to detect a plurality of distinct execution plans for a single query in historical execution plan for the last 8 hours.

Thus, according to these embodiments, certain 'older' historical performance data is effectively discarded for the purposes of detecting changed execution plans, and the results of the detecting are insensitive to execution plans used for at a time outside of the 'decision influencing' historical time period, which, in some embodiments, may be determined at least in part by the historical time period parameter.

Thus, according to these embodiments, if during the 'decision influencing' historical time period, the query is always associated with the same execution plan (or the query is only handled once) and this 'single' execution plan differs from a previous execution plan used at a time outside of the specific historical time period (e.g. before the historical time period), this 'execution plan change' may go undetected.

In some embodiments, the user (for example, the DBA) may specify this 'detection influencing' historical time period in accordance with the specifics of the database management system 310. Alternatively or additionally, this 'detection influencing' historical time period may be determined in accordance with one or more default parameters.

Discussion of FIG. 3A (part 2)

In step 522, it is determined, in accordance with the results of the attempt to detect the change in the execution plan 518 (i.e. using the routine described in FIG. 3B or any other routine), if an execution plan has been detected. In the event that a change in an execution plan was detected, an alert signal may be generated 526.

This may be carried out, for example, by first setting an 'alert flag' in memory, or by notifying an alert agent 326.

In exemplary embodiments, the 'decision' of whether or not to generate an alert signal is carried out in a manner that is insensitive to the 'type' of execution plan change—as long as some sort of execution plan change is detected, the alert signal is generated. Thus, in some embodiments, the alert agent 326 is operative within the apparatus or system (i.e. in cooperation with the detector agent 322) such that the generation of the alert signal is carried out in an execution plan change type-independent manner (i.e. the 'go/no go' decision to generate the alert signal is insensitive to the type of execution plan change).

Similarly, in some embodiments, the generated alert signal itself does not include information about the type of execution plan change and/or does not include information about the database statement for which there was an execution plan change and/or does not include information about one or more tables associated with the database statement for which there was an execution plan change.

The 'alert signal' may be provided in a number of forms, all of which are in the scope of the present invention. In one example, an email is sent to a user. In another example, a sound is generated, or a visual notification is displayed on a display screen. In another example, a text message is sent to a portable electronic device, for example, a cellphone or personal digital assistant (PDA).

Figure 4A:
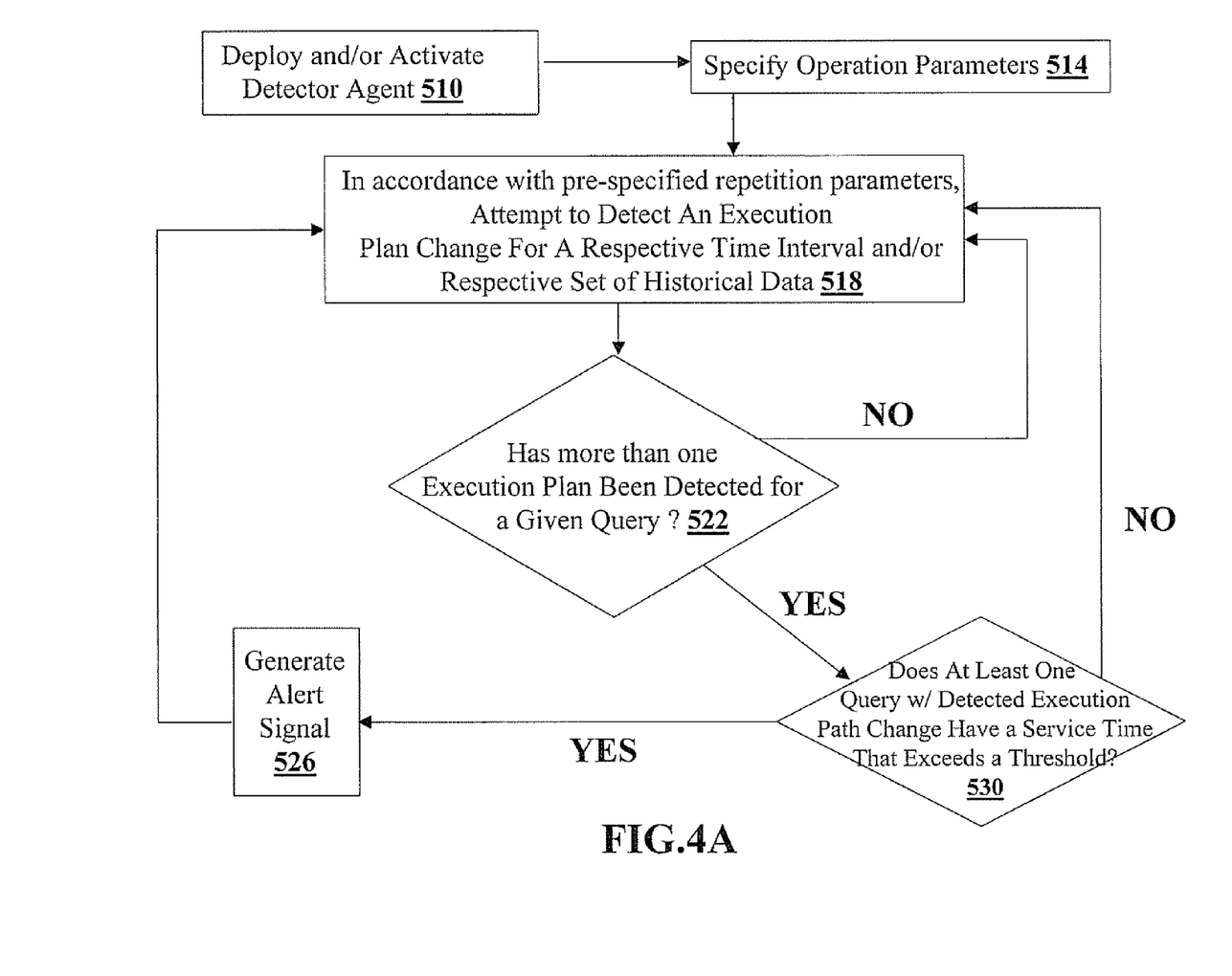
Figure 4B:
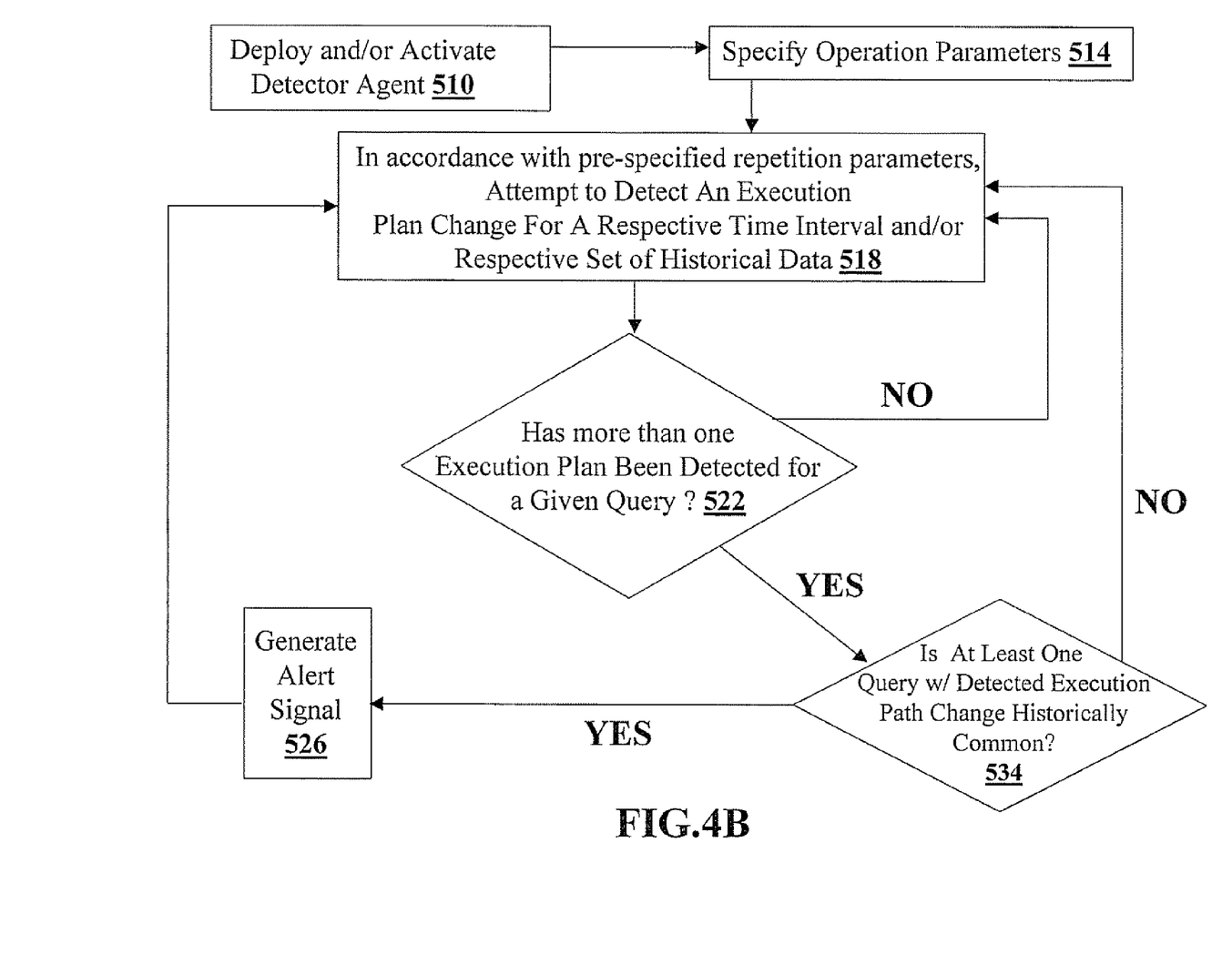
Figure 4C:
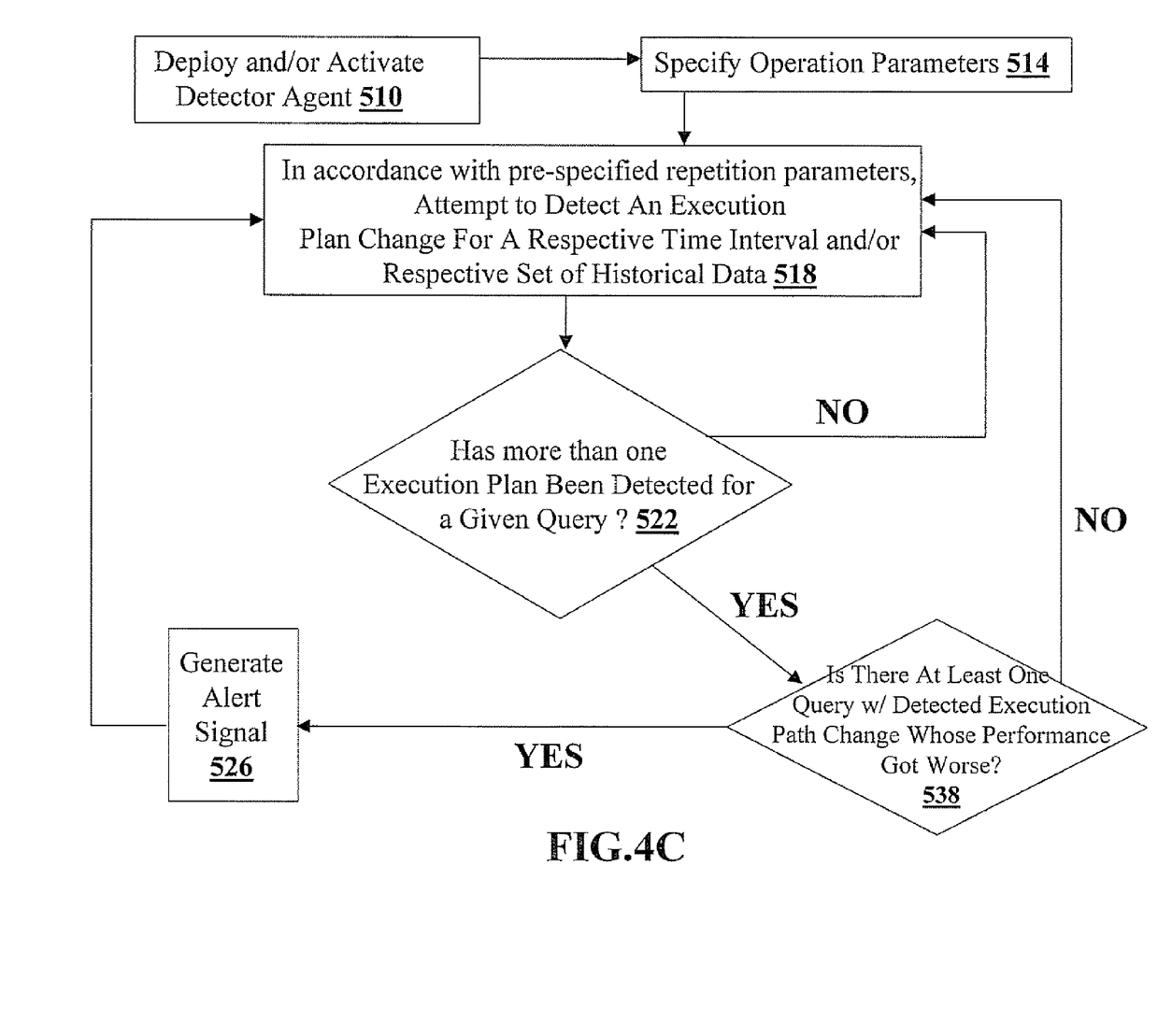

Discussion of FIGS. 4A-4C

FIG. 4A describes a routine for detecting execution plan changes and generating an alert signal contingent on the detecting in accordance with some embodiments of the present invention. In the examples of FIGS. 4A-4B, it is desired to only generate an alert signal if an execution plan was changed for what may be an 'important' query or query considered likely to have an impact (for example, a negative impact) upon database performance.

In the example of FIG. 4A, a detected change in an execution plan is not sufficient by itself to trigger the alert signal. Instead, only if the execution time of the query having a changed execution plan exceeds a pre-determined threshold is an alert signal generated.

In the example of FIG. 4B, a detected change in an execution plan is not sufficient by itself to trigger the alert signal. Instead, only if the query having a changed execution plan is historically executed with at least a pre-determined frequency is an alert signal generated. This may be determined in a number of ways. In one example, the frequency of the query may be determined from historical data detected by a collector agent 314.

In the example of FIG. 4C, a detected change in an execution plan is not sufficient by itself to trigger the alert signal. Instead, only if the execution plan change is associated with degradation of performance (i.e. when the database statement is executed with the 'newer' execution plan, the performance is worse—for example, the database statement executes 'slower' with a longer service time—for example, a service time that increases by at least a pre-determined absolute or relative threshold)

It is appreciated that various steps in FIGS. 4A-4C may be carried out in a different order. In some embodiments, more than one step is carried out 'simultaneously' in a single step—for example, by simultaneously enforcing more than one requirements (for example, requirements of 522 and 530, requirements of 522 and 534, requirements of 522 and 538).

It is further noted that any of the embodiments described above may further including receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb. All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. An apparatus for monitoring execution plans of a relational database, the apparatus comprising:
    a) at least one of a volatile and a non-volatile memory; configured to store a detector agent and an alert agent; and
    b) a microprocessor operative to:
        i) execute code of the detector agent to monitor the performance of the relational database to detect an execution plan change for at least one database statement handled by the relational database; and
        ii) execute code of the alert agent to generate an alert signal, contingent on results of said detecting of said execution plan change.

2. The apparatus of claim 1 further comprising:
    a performance data collector agent, wherein execution of the performance data collector agent by the microprocessor is operative to collect performance data comprising execution plan data for the database;
    wherein said execution of said detector agent is operative to detect said execution plan change from said collected execution plan data.

3. The apparatus of claim 2 wherein said execution of said performance data collector agent is operative such that said collecting of said performance data comprises effecting a query of a system table of the database.

4. The apparatus of claim 2 wherein said execution of said performance data collector agent is operative such that said collecting of said performance data comprises effecting an API call to the database.

5. The apparatus of claim 2 wherein said execution of said performance data collector agent is operative to collect said performance data comprising said execution plan data for a pre-specified historical time interval.

6. The apparatus of claim 2 wherein said execution of said collector agent is operative to effect a plurality of distinct said execution plan data collectings at a frequency that is determined at least in part by a pre-determined frequency parameter.

7. The apparatus of claim 1 wherein said detector agent is operative such that execution of said detector agent effects a plurality of said execution plan detectings at a frequency that is determined at least in part by a pre-determined frequency parameter.

8. The apparatus of claim 1 further comprising:
c) a configuration user interface for receiving at least one user specified operation parameter selected from the group consisting of:
   i) a detection frequency parameter;
   ii) decision influencing historical time period parameter,
wherein said execution of detector agent is operative to effect said monitoring in accordance with at least one said user specified operation parameter.

9. The apparatus of claim 1 wherein said execution of said detector agent is operative to detect said execution plan change for a pre-determined decision influencing historical time period.

10. The apparatus of claim 1 wherein at least one of:
i) said alert agent; and
ii) said detector agent, is at least partially an internal agent that resides at least in part within a code module of the database.

11. The apparatus of claim 1 wherein at least one of:
i) said alert agent; and
ii) said detector agent, is at least partially an external agent that resides at least in part within a code module that is external to the database.

12. The apparatus of claim 1 further comprising:
c) at least one of a video display and an audio speaker for presenting the generated alert signal.

13. A method for monitoring execution plans of a relational database, the method comprising:
a) automatically and electronically monitoring the performance of the relational database by executing code of a detector agent by a microprocessor to detect an execution plan change for at least one database statement handled by the relational database; and
generating an alert signal, contingent on results of said detecting of said execution plan change.

14. The method of claim 13 wherein said monitoring comprises automatically effecting a plurality of said execution plan detectings at a frequency that is determined at least in part by a pre-determined frequency parameter.

15. The method of claim 13 further comprising:
c) receiving, via a user interface at least one user specified operation parameter selected from the group consisting of:
   i) a detection frequency parameter;
   ii) decision influencing historical time period parameter,
wherein said monitoring is carried out in accordance with at least one said user specified operation parameter.

16. The method of claim 13 wherein the monitoring includes:
(i) automatically and electronically submitting to the relational database, a plurality of times, requests for data indicative of contents of one or more system tables of the relational database; and
(ii) receiving the requested system table-indicative data from the relational database.

17. The method of claim 16 wherein the relational database is distributed over a plurality of different digital computers connected via a computer network, and the monitoring includes monitoring execution of the distributed relational database.

18. The method of claim 13 wherein the generating of the alert signal includes displaying a visual indication of the alert signal on a video display device.

19. The method of claim 13 wherein the generating of the alert signal includes: sending an email message via an interface between a computer and a computer network.

20. The method of claim 13 wherein the generating of the alert signal includes sending a text message to a mobile telephone via a network.

21. The method of claim 13 further comprising:
c) executing code of a performance data collector agent by a microprocessor to collect performance data comprising execution plan data for the database,
wherein said execution of said code of said detector agent is operative to detect said execution plan change from said collected execution plan data.

* * * * *

UNITED STATES PATENT AND TRADEMARK OFFICE
CERTIFICATE OF CORRECTION

| | |
|---|---|
| PATENT NO. | : 7,634,459 B1 |
| APPLICATION NO. | : 11/560391 |
| DATED | : December 15, 2009 |
| INVENTOR(S) | : Ehud Eshet et al. |

It is certified that error appears in the above-identified patent and that said Letters Patent is hereby corrected as shown below:

Claim 13, column 13, line 34: insert "b)" at the beginning of the line before "generating an alert signal ..."

Signed and Sealed this

Sixteenth Day of February, 2010

David J. Kappos
*Director of the United States Patent and Trademark Office*